Figure 1:
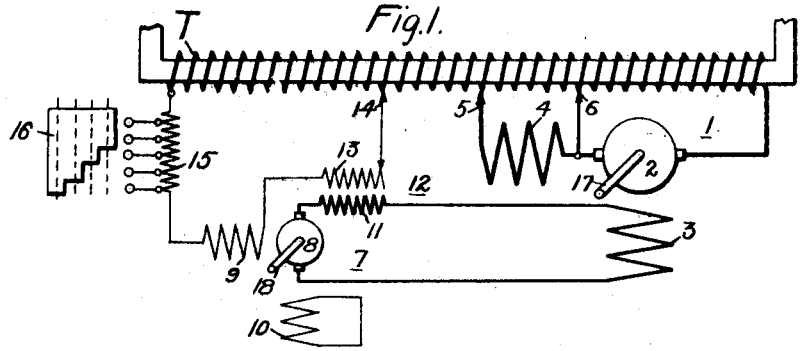

Feb. 12, 1924.

R. E. HELLMUND

SYSTEM OF CONTROL

Filed March 11, 1919

1,483,439

3 Sheets-Sheet 1

WITNESSES:
J. A. Helsel.
W. R. Coley

INVENTOR
Rudolf E. Hellmund.
BY
Wesley G. Carr
ATTORNEY

Feb. 12, 1924.
R. E. HELLMUND
1,483,439
SYSTEM OF CONTROL
Filed March 11, 1919    3 Sheets-Sheet 2
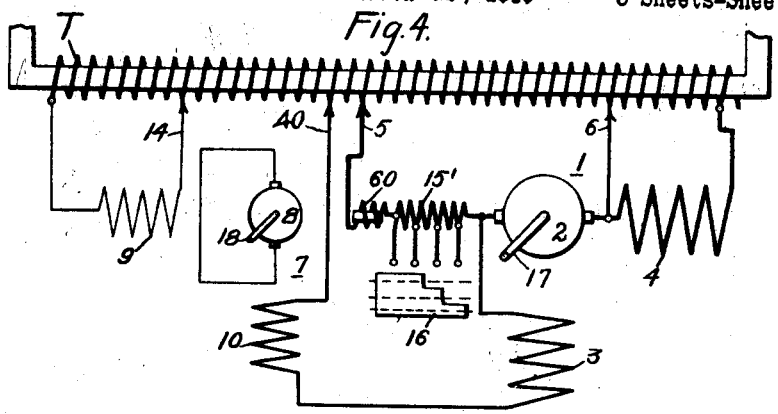
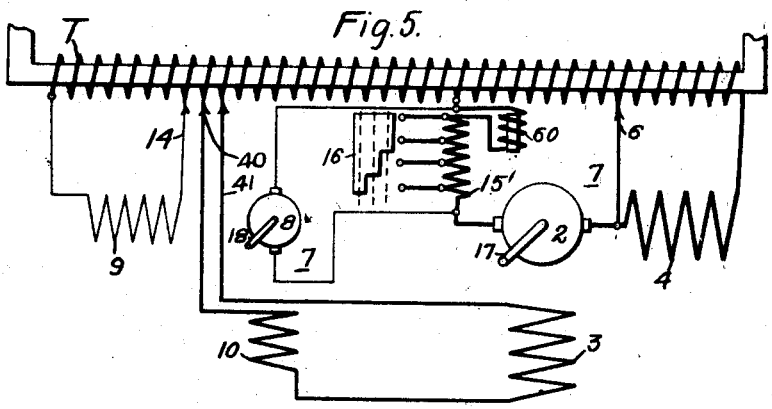
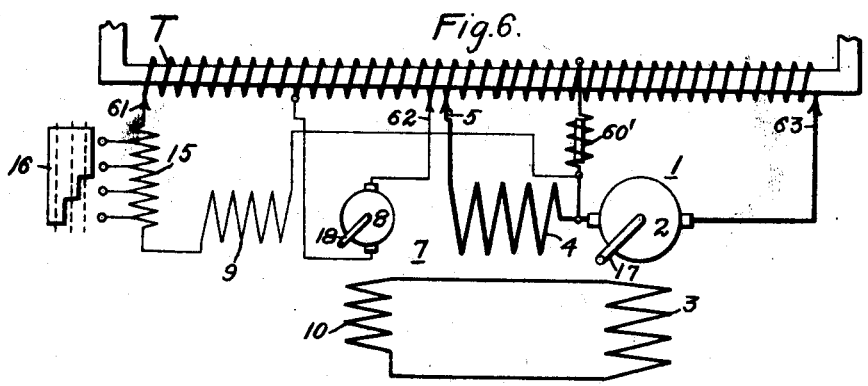
WITNESSES:
J. A. Helsel
W. R. Coley
INVENTOR
Rudolf E. Hellmund.
BY
Wesley G. Carr
ATTORNEY Feb. 12, 1924.
R. E. HELLMUND
SYSTEM OF CONTROL
Filed March 11, 1919
1,483,439
3 Sheets-Sheet 3
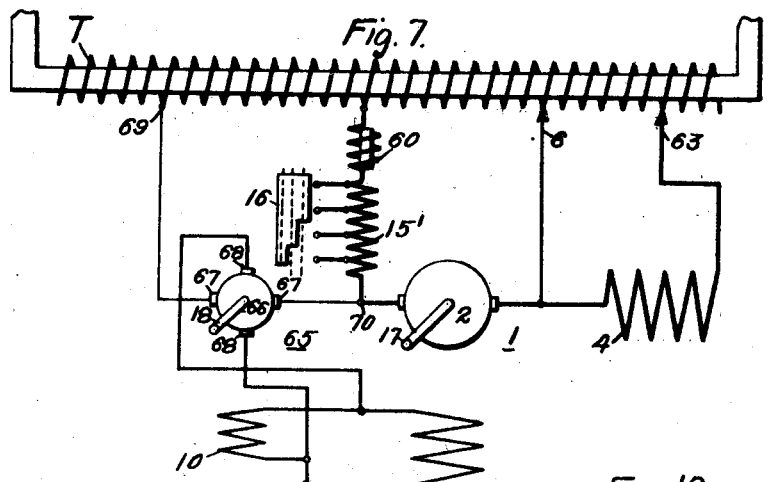
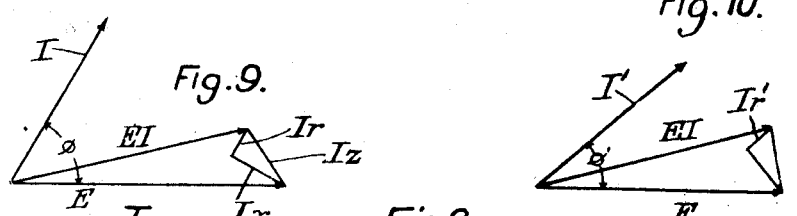
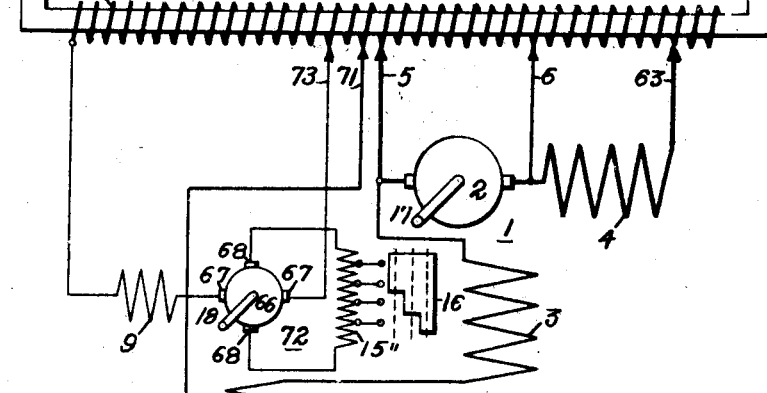
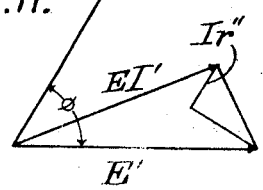
WITNESSES:
J. A. Helsel.
W. R. Coley.
INVENTOR
Rudolf E. Hellmund.
BY
Chesley G. Carr
ATTORNEY Patented Feb. 12, 1924.

1,483,439

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed March 11, 1919. Serial No. 281,954.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control for alternating-current commutator motors, and it has for its object to provide simple and inexpensive means for reliably regulating the power-factor of such motors under varying-load conditions.

It is known in the art that, during regenerative control of single-phase commutator motors, it is possible to obtain proper phase adjustment of the regenerating machine under varying-load conditions by inserting a resistor in the exciting circuit of the customarily employed auxiliary excitor machine. The use of such a resistor for providing proper phase adjustment is very convenient and inexpensive, since the resistor may be regulated by means of an ordinary drum controller, or the like, without necessitating the employment of preventive devices between control steps. On the other hand, any adjustment that is effected by shifting supply-transformer-winding taps, or the taps of an induction coil, is usually accompanied by severe arcing and, moreover, causes complication by requiring preventive bridging devices. Furthermore, the resistor alone is not capable of regulating the power-factor throughout a wide range of operation, if employed as hitherto proposed.

It is, therefore, one purpose of my present invention to provide a relatively simple system for providing power-factor regulation throughout the normal operating range of motors of the type mentioned by permanently including a number of supply-transformer-winding turns in the main-machine field circuit, thus adding any desired voltage in phase with the source of supply. Other equivalent means or organizations may be employed for shifting the total or resultant motor field voltage in one direction into a certain abnormal phase relation for either motoring or regenerating conditions, and I employ other means, preferably in the form of an adjustable resistor, for varying the phase relation in the opposite direcion, as required to produce the desired power-factor, such resistor being usually connected either in the main-field-winding circuit or in the exciting circuit of the exciter machine. Consequently, the desired power-factor of the alternating-current commutator motor may be maintained, either at will or automatically, by merely varying a resistor.

It is another object of my invention to provide a system of regeneration in which self- or auto-excitation, with low-frequency currents or direct currents, is avoided.

My invention may best be understood by reference to the accompanying drawings, wherein—

Figure 1 is a diagrammatic view of the essential circuit connections of a system of control embodying my present invention, Fig. 2 to Fig. 8, inclusive, are similar diagrammatic views of various modifications of the invention, and Figs. 9 to 11, inclusive, are vector diagrams illustrating one form of my invention.

Referring to Fig. 1, the system shown comprises a suitable source of supply, such as the secondary winding T of a railway-vehicle transformer; and a single-phase commutator motor 1 of the series, compensated type, having an armature 2, an exciting field winding 3 and a compensating or inducing field winding 4. A plurality of adjustable transformer taps 5 and 6 are respectively connected to the outer and to the inner terminal of the inducing field winding 4 and, consequently, the illustrated motor is of the familiar transformer-conduction or doubly-fed type, although, as will be understood, my invention is not so restricted in its application.

An auxiliary exciter machine 7 comprises a commutator-type armature 8, an exciting field winding 9 and a short-circuited or inductively compensating field winding 10. The auxiliary armature 8 is connected, through the secondary winding 11 of an auxiliary transformer 12, to the exciting field winding 3 of the main machine, while the exciting field winding 9 for the auxiliary machine is connected, through the primary winding 13 of the auxiliary transformer and an adjustable tap 14, to an intermediate point of the main transformer winding T, the other terminal of the auxiliary field winding 9 being connected, through a resistor 15, which may be varied in a familiar manner by means of a control drum 16, to another suitable point in the supply-transformer winding. It will be understood that the illustrated machines are, in some way, mechanically connected to the vehicle axles, which are indicated at 17 and 18 for the main and the auxiliary machine, respectively, although any other suitable means may be employed for the purpose.

Assuming that the illustrated circuits have been established by any well-known method, which it is unnecessary to describe here, the regulating operation of my invention may be set forth as follows. It is evident that the auxiliary transformer or inductive device 12 shifts the angle of the current in the main field winding 3 in a direction dependent upon the action of the primary winding 13 of the auxiliary transformer, whereby a voltage derived from the supply transformer winding is superimposed upon the quadrature-related exciting voltage that is generated by the auxiliary machine 7. By then regulating the adjustable resistor 15, through the agency of the manually-operated controller 16, the resultant voltage that is impressed upon the main field winding 3 may be varied in a manner corresponding to the variation of the field strength of the auxiliary field winding 9, to produce the desired angle of excitation in the main field winding 3, whereby the desired power-factor regulation may be obtained when the main machine is acting either as a vehicle-propelling motor or as a regenerating machine driven by the momentum of the associated vehicle.

Instead of regulating the power-factor entirely by the resistor, in some cases it may be found desirable to effect large degrees of regulation by means of the movable transformer tap 14, the final or close regulation being then accomplished by means of the resistor 15 and the associated controller 16.

Figure 2:
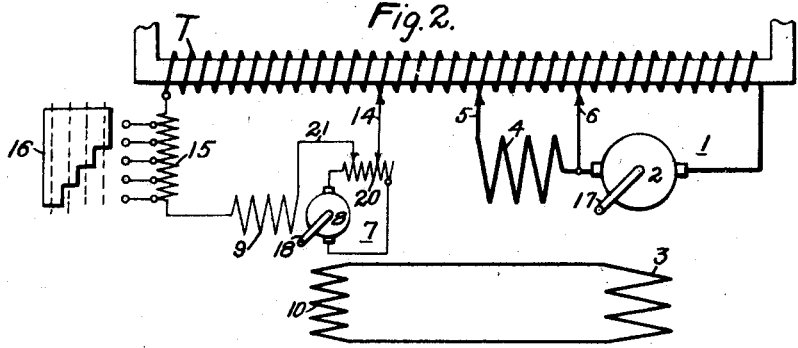

In Fig. 2, the auxiliary armature 8 is connected to an auto-transformer winding 20 which takes the place of the two-coil type of transformer 12 that is illustrated in Fig. 1. The inducing or compensating field winding 10 for the auxiliary machine is connected to excite the main field winding 3 by means of the familiar transformer action between the auxiliary armature 8 and its field winding 10. The auxiliary exciting field winding 9 is connected, by a movable tap 21, to the auto-transformer 20, which is also connected, through the shiftable transformer tap 14, to the main transformer winding.

The operation of the system illustrated in Fig. 2 is similar to that set forth in connection with Fig. 1, but, in addition, the voltage furnished by the auxiliary transformer 20 may be reversed, if desired, by interchanging the illustrated relative positions of the movable taps 14 and 21.

Figure 3:
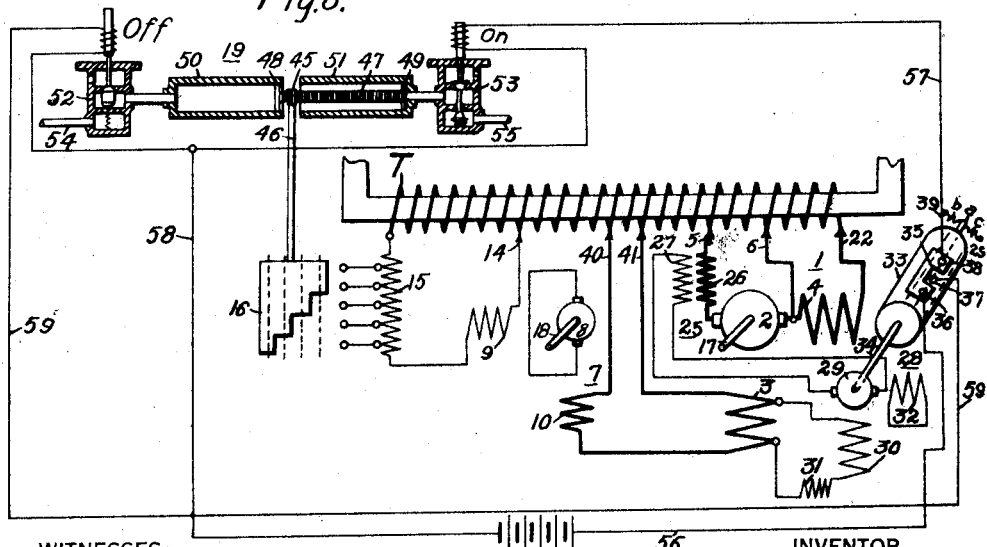

Referring to Fig. 3, the illustrated system comprises the various elements that are illustrated in Fig. 1, in a modified arrangement to be described, and, in addition, the controller 16 is provided with an operating mechanism 19, which is automatically controlled by a torque-motor-relay device 28 in accordance with the load and power-factor conditions of the main machine.

In the present instance, the main compensating field winding 4 is connected through a movable end-tap 22 of the main transformer winding T and the intermediate tap 6, while the main armature 2 has one terminal connected to the intermediate tap 6 and the other terminal connected, through the primary winding 26 of an auxiliary transformer 25, to the main transformer tap 5. The main exciting field winding 3 is connected in series relation with the auxiliary inducing field winding 10 through a small portion of the main transformer winding T, the value of which portion may be suitably varied, by means of taps 40 and 41, to shift the phase of the main excitation in a direction opposite to that effected by the adjustment of the resistor 15.

In the present instance, the auxiliary exciter is illustrated as being of the repulsion type having its armature 8 short-circuited. The auxiliary exciting field winding 9 is connected, through the main transformer tap 14 and the adjustable resistor 15, to the desired section of the main transformer winding.

The torque-motor-relay device 28 comprises a commutator-type armature 29 which is connected across the secondary winding 27 of the auxiliary transformer, an exciting field winding 30, which is connected through a voltage-reducing and phase-modifying impedance 31 to the terminals of the main field winding 3 and a short-circuited compensating field winding 32. A control drum 33 is mounted upon the shaft 34 of the torque motor and is provided with a contact segment 35 of a configuration suitable for engaging various combinations of a plurality of control fingers 36, 37 and 38 in positions $a$, $b$ and $c$ of the relay device, for the purpose of automatically controlling the movement of the resistor-varying controller 16, as hereinafter described in detail. The relay device 28 is normally held in its intermediate position $a$ by means of suitable centering springs 39.

The operating mechanism 19 for the controller 16 is of a familiar electrically-controlled, pneumatically-actuated type comprising a pinion 45 which is secured to one end of the operating shaft 46 of the controller and meshes with a transversely movable rack member 47, the opposite ends of which constitute pistons 48 and 49 traveling within operating cylinders 50 and 51, respectively. A valve member 52 is normally open to admit fluid pressure, from any suitable source (not shown), through a pipe or passage 54 to the operating cylinder 50, thus biasing the mechanism to the illustrated extreme position. A second valve member is associated with the other operating cylinder 51 to normally exclude high-pressure fluid, entering the valve by a pipe or passage 55, from the operating cylinder 51, which initially communicates with the atmosphere. The valve members 52 and 53 are respectively provided with actuating coils "off" and "on" for reversing the functions of the valve.

The mechanical operation of the actuating apparatus 19, without regard to the electrical connection effected thereby, may be set forth as follows. Upon concurrent energization of the actuating coils "on" and "off", the initially unbalanced fluid-pressure conditions in the mechanism are reversed, that is, fluid pressure is admitted through the valve 53 to the cylinder 51 and is exhausted from the other cylinder 50 through the valve 52 to the atmosphere. Consequently, movement of the illustrated piston members toward the left and, therefore, of the controller 16 towards the right, is effected. To arrest such movement at any time, it is merely necessary to de-energize the "off" magnet, whereupon balanced high-pressure fluid conditions obtain in the mechanism and a positive and reliable stoppage thereof is secured.

To produce a return movement of the device, the actuating coils "on" and "off" are concurrently de-energized, whereupon fluid-pressure conditions in the apparatus revert to the original unbalanced state, and the desired backward movement is effected.

Under operating conditions of the illustrated system, when the torque-motor relay device 28 occupies its normal intermediate position a, an auxiliary circuit is established from a suitable source of energy, such as a battery 23, through conductor 56, control fingers 36 and 38, which are bridged by contact segment 35 of the relay device, conductor 57, actuating coil "on" of the operating mechanism 19, and conductor 58 to the negative terminal of the battery 23. Fluid pressure is thus admitted to the operating cylinder 51, but no movement of the mechanism 19 occurs, since balanced high-pressure conditions obtain in the two operating cylinders.

However, the relay device and the impedances of its circuits are so designed, with respect to the degree of energization of its armature 29 and exciting field winding 30, which are respectively energized in accordance with the main-armature or load current and the main-field-winding voltage, as to have substantially zero torque, when a predetermined power-factor, preferably unity, of the main machine, obtains. Whenever the phase angle of the main-machine current changes in one direction or the other, with respect to the impressed exciting-field-winding voltage, the relay device will develop torque in the proper direction and will occupy either position b or position c, to actuate the controller 16 in such direction as to oppose or counteract the phase angle of the field excitation that is produced by means of the section of the supply-transformer that is included between taps 40 and 41.

Assuming, for example, that it is necessary to decrease the resistor 15 in order to provide the desired counteracting effect, then the relay device 28 will occupy its position b, whereby, in addition to the circuit previously traced through the actuating coil "on", another circuit is completed from contact segment 35 through control finger 37, conductor 59 and the actuating coil "off" to the negative conductor 58. Consequently, both actuating coils for the mechanism 19 are concurrently energized, and forward movement of the controller 16 to short-circuit sections of the resistor 15 occurs until the desired phase relation is again obtained, when the centering springs 39 of the torque-relay device will cause it to reassume its normal intermediate position a.

Conversely, when it is desired to shift the phase of the field excitation in the opposite direction, the torque developed in the relay device 28 causes a movement thereof to position c, wherein both actuating coils "on" and "off" are de-energized, and a backward movement of the controller 16 is effected in accordance with previously-described principles, to gradually increase the active circuit value of the resistor 15.

In this manner, any desired power-factor, dependent upon the initial design or setting of the relay device, may be automatically maintained throughout the operation of the system.

The load of the machine is regulated in the usual manner by varying the voltage impressed upon the motor, i. e. by shifting one or more of the taps 5, 6 and 22. This method of controlling the load has the advantage that, in case a machine is used with separate excitation, as shown, and also as a straight series or doubly-fed motor, the same switching arrangement may be employed for speed and load control under both operating conditions. However, it should be noted that, with the connections of Fig. 3, the shifting of the taps 5, 6 or 22 does not materially affect the delivered power directly, but rather causes the power-factor relations to temporarily depart from those previously established by the relay. As soon as this condition obtains, the relay effects the operation of the mechanism 19 and the drum 16, thereby re-establishing the desirable power-factor and simultaneously changing the delivered power to a different value. While, therefore, the shifting of the motor taps does not directly change the delivered power materially, such change is nevertheless brought about indirectly, as just described.

These statements may be explained by reference to the accompanying vector diagrams, Figures 9, 10 and 11, wherein—

E=Impressed voltage from transformer winding T.

El=Counter-electromotive force of motor 1.

Iz=Impedance drop in main circuit.

Ix=Inductive drop in main circuit and

Ir=Resistance drop in main circuit.

Therefore, I, in Fig. 9, in phase with Ir, represents the load current under what may be termed normal conditions, corresponding to a given set of positions of the transformer taps 5, 6 and 22.

In Fig. 10, the vector El, representing counter-electromotive force, remains as before, but the impressed E. M. F. E' has been varied by suitably shifting the taps. Under these conditions, it will be noted that the resistance drop I'r and, therefore, the load current vector I' is not materially changed in magnitude but merely in direction as indicated by the changed phase angle ø'; in other words, the power factor relations are changed.

However, the re-establishment of the desired power-factor by the relay device 28 then occurs, as indicated by Fig. 11. The changed counter-electromotive force, corresponding to the new position of the transformer taps, is represented by El'.

The increased value of the resistance drop I''r is paralleled by the proportionally increased value of the load current I''.

In this way the change of delivered power is brought about indirectly by the shifting of the taps, as previously stated.

Instead of adjusting the motor taps for the purpose of load adjustment, the same results may be accomplished by shifting the tap 14 of the exciter field winding 9.

In Fig. 4, the auxiliary transformer 12 of Fig. 1 is replaced in part by a single inductive device 60, which is connected in series relation with a variable resistor 15' and the main armature 2 across the movable main transformer taps 5 and 6. The main exciting field winding 3 has one terminal connected, through the auxiliary inducing field winding 10, to the movable transformer tap 40, while the other terminal is connected to a point intermediate the main armature 2 and the adjustable resistor 15'. The resistor 15' and the inductive device 60 are thus connected to carry the resultant of the main-armature and main-field-winding currents or, in other words, are connected in the outer lead of the main-machine circuit. The small section of the supply-transformer winding that is included between taps 5 and 40, together with the inductive device 60, provides the phase-shifting that the adjustable resistor 15' is adapted to counteract. In some cases, the system of Fig. 4, when combined with an automatic regulating system, such as that previously described, may have certain inherent advantages over the type of system that is illustrated in Fig. 3.

The operation of the system of Fig. 4 and of the following systems will be clear from their analogy to those already described.

In Fig. 5, the adjustable resistor 15' and the inductive device 60 are connected in series relation with the main armature 2, and the auxiliary armature 8 is connected across the inductive device and the resistor, both of which are thus traversed by the resultant current of the main armature and also of the exciter armature. In this instance, the auxiliary inducing field winding 10 is connected in series relation with the main exciting field winding 3 and a small section of the supply-transformer winding T, as determined by the movable taps 40 and 41.

In Fig. 6, the inductive device 60' is connected in circuit to carry the difference between the armature and inducing-field-winding currents of the main machine combined with the currents of the auxiliary exciting field winding 9. This result is accomplished by connecting the inductive device 60' in the middle lead of the illustrated doubly-fed main motor above the point where the circuit, comprising the adjustable resistor 15 and the auxiliary exciting field winding 9, is connected to the middle lead.

In the present case, the outer tap 61 of the auxiliary exciting-field-winding circuit and the outer tap 63 of the main-armature circuit are both made adjustable, while the circuit of the auxiliary armature 8 is connected across an intermediate portion of the supply-transformer winding T and is also provided with a shiftable tap 62. The auxiliary inducing field winding 10 is employed for the purpose of furnishing exciting and phase-shifting energy to the main field winding 3 similarly to the system that is illustrated in Fig. 2. Adjustment of the resistor 15 again opposes the phase shift that is caused by the excitation just mentioned.

In Fig. 7, an exciter machine 65 of the armature-excited type is illustrated. The inductive device 60 and the adjustable resistor 15' are connected in the left-hand outer lead of the main-armature circuit, the exciting brushes 67 of the exciter armature 66 being connected from an intermediate point 69 of the supply transformer winding to the common junction-point 70 of the main armature 2 and the adjustable resistor 15'. The working-circuit brushes 68 are connected to the terminals of the parallel-related auxiliary inducing field winding 10 and main exciting field winding 3.

In Fig. 8, a doubly-excited auxiliary exciter machine 72 is illustrated. The exciting-circuit brushes 67 are connected in series relation with the auxiliary exciting field winding 9 from the left-hand terminal of the supply transformer T to a movable tap 73 that is connected to an intermediate point of the transformer winding. The working-circuit brushes 68 are connected in series relation with an adjustable resistor 15'', while another circuit is established from an intermediate movable tap 71 of the supply transformer winding through the auxiliary inducing field winding 10 and the main exciting field winding 3 to the end-tap 5 of the main machine circuit. A small section of the supply-transformer winding is thus connected in the exciting circuit of the motor to produce a phase shift that the adjustment of the resistor 15 counteracts.

It will be seen that I have thus provided various types of systems embodying field-producing means for single-phase commutator motors, wherein an inductive device is employed to shift the phase-angle of the main field excitation in one direction, while manual or automatic means is provided for counteracting such shifting by causing the phase of the field excitation to vary in the opposite direction.

In do not wish to be restricted to the specific circuit connections and arrangement of parts herein set forth, as various modifications may be made therein without departing from the spirit and scope of my invention. I desire, therefore, that only such limitations shall be imposed thereon as are indicated in the appended claims.

I claim as my invention:

1. In a system of control, the combination with an alternating-current commutator motor having an armature and field-producing means, of an exciter machine for said motor, adjustable phase-shifting means for influencing said exciter machine, a control device for governing said phase-shifting means, and a torque-relay device having its component elements respectively energized in accordance with the motor load current and field excitation for effecting actuation of said control device.

2. In a system of control, the combination with a source of supply and an alternating-current commutator motor having an armature and an exciting field winding, of an exciter machine for energizing said field winding and having an exciting field winding connected to said source, an adjustable resistor connected in circuit with the exciting field winding for said exciter machine, a controller for varying said resistor, and a torque-relay device for effecting movement of said controller, said device having its armature inductively energized in accordance with the motor load current and having a field winding energized in accordance with the exciting-field voltage of said motor.

3. In a system of control, the combination with an alternating-current commutator motor having a working and an exciting circuit, means for adjusting the relative values of the impressed and the counterelectromotive forces of the working circuit, and other means for modifying the phase of said counterelectromotive forces, one of said means being operative at will and the other means being automatically controlled in accordance with the phase relation of certain machine circuits.

4. In a system of control, the combination with an alternating-current commutator motor having a working and an exciting circuit, means for adjusting at will the relative values of the impressed and the counterelectromotive forces of the working circuit, and other means responsive to the phase relation of certain machine circuits for modifying the phase of said counterelectromotive forces.

5. In a system of control, the combination with an alternating-current commutator motor having a working and an exciting circuit, means for adjusting the relative values of the impressed and the counterelectromotive forces of the working circuit, and other means for modifying the phase of said counterelectromotive forces, at least one of said means being automaticaly controlled in accordance with the phase relation of certain machine circuits.

In testimony whereof, I have hereunto subscribed my name this 1st day of March 1919.

RUDOLF E. HELLMUND.